Feb. 7, 1967 — H. C. SCHMID — 3,302,408
SUB-SURFACE SOIL IRRIGATORS
Filed Feb. 13, 1964
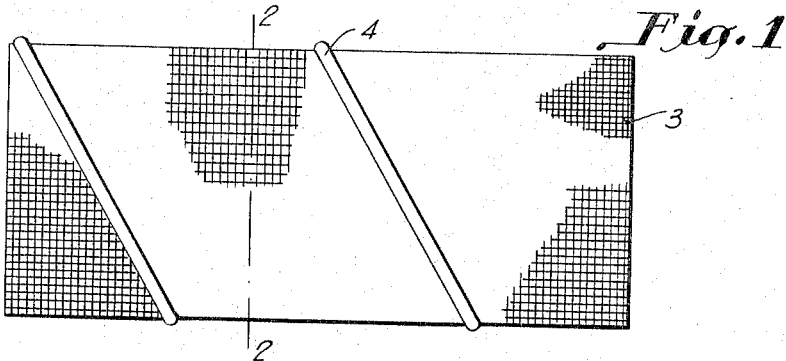
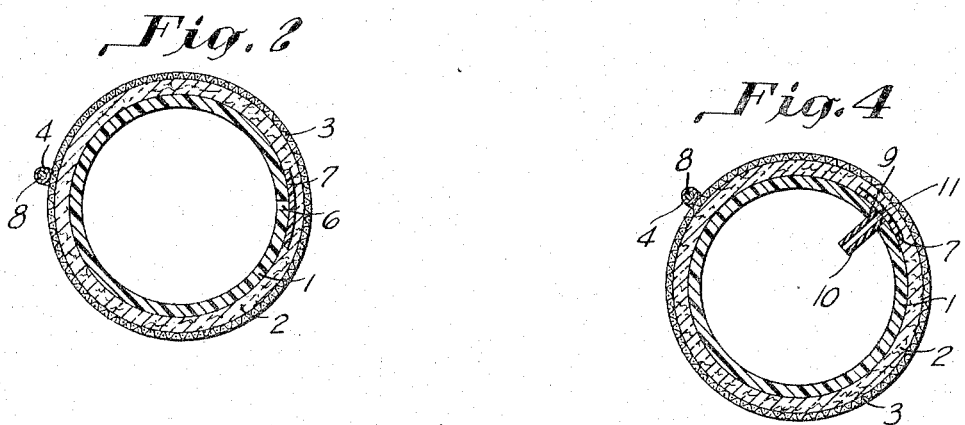
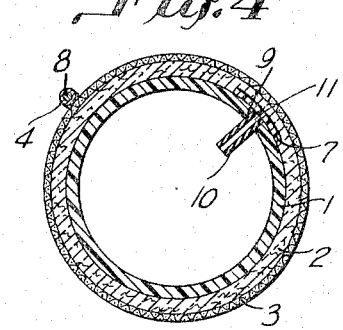
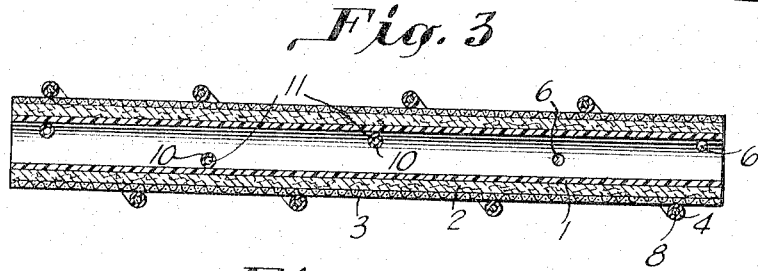
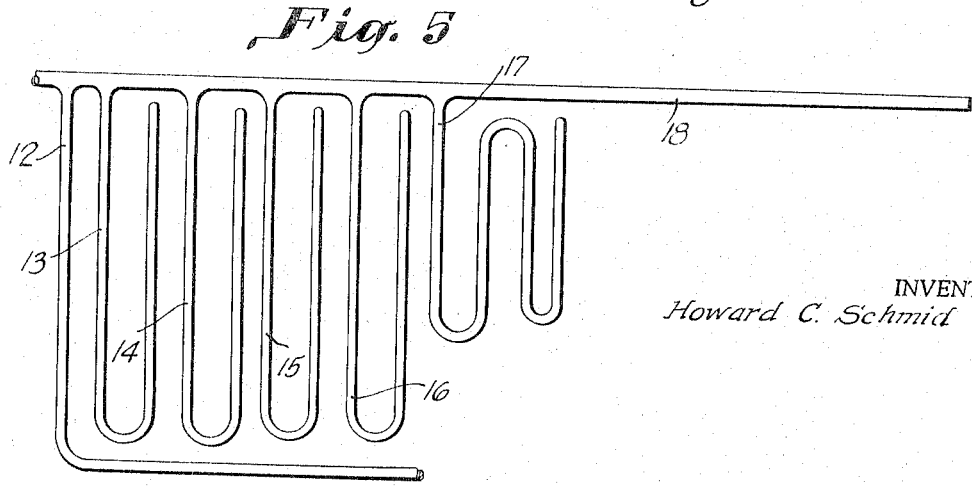
INVENTOR
Howard C. Schmid United States Patent Office 3,302,408
Patented Feb. 7, 1967

3,302,408
SUB-SURFACE SOIL IRRIGATORS
Howard C. Schmid, 638 W. Kent Ave.,
Missoula, Mont. 59801
Filed Feb. 13, 1964, Ser. No. 344,652
2 Claims. (Cl. 61—13)

My invention relates to an improved sub-surface soil irrigator as well as the method of manufacture.

During the years man has tilled the soil and nurtured crops thereon, three general systems of supplying moisture to the soil to supplement natural rainfall have been utilized.

The first of these, the use of open ditches to transport the water by gravity to the desired location, thence across fields by smaller and smaller ditches and laterals has the following disadvantages:

(1) Great loss of water by seepage.
(2) Loss of water by evaporation.
(3) Excessive manpower to maintain ditches and direct water.
(4) Ditches occupy and remove from tillage much valuable land area.
(5) Ditches are obstacles to man and machines.

The second system of supplementary rainfall is that of above-ground sprinkling which has these disadvantages:

(1) Requires expensive equipment which wears rapidly.
(2) Great loss of water from evaporation.
(3) Often washes and erodes soil.
(4) Equipment is cumbersome and hinders movement on land.
(5) Much loss of water on edges and corners due to uneven distribution.
(6) Leaves soil muddy and unworkable.
(7) Results in caking of soil.

The third system of irrigating the soil is from under the surface and this system prior to my invention has had these disadvantages:

(1) Cost of equipment has been prohibitive.
(2) Installation costs precluded use in some cases because design required special handling.
(3) No single device included all or a major portion of requirements for successful operation, i.e., permanent, root-proof, freeze-proof (full or empty), flexible, unaffected by grade, useful in any soil without structural alteration, layable in any position, operational under a wide range of pressures such as 5 p.s.i. to 80 p.s.i., and easily stored and handled.

It has been proposed to combine open ditches with underground permeable tubes for irrigation, but this again reverts to ditches with their many disadvantages along with feeble movement and poor control of water from the low heads of ditches into small, permeable tubes.

Water for most purposes in our modern, efficient world of today is moved under pressure, not only to move it great distances in small pipes, but to secure accurate control at all points along those pipes.

It will be obvious that the third system of irrigation is far superior to the first two or combinations thereof because only it has these disadvantages:

(1) No water need be wasted.
(2) Entire surface of soil is unobstructed.
(3) Promotes long root growth, eliminating "hot spell" burning.
(4) Does not cause caking of soil.
(5) Moisture content of soil can be accurately controlled.
(6) Easily adapted to other uses if desired, such as fertilizing, air injection, insect, weed and temperature control.

I am aware of the many patents previously issued containing numerous novel ideas on the irrigation and treatment of soil with underground devices. However novel these devices may be, an invention is only useful when used and will only be used when the cost of production and installation is commensurate with the service it renders.

Though many of the simple, basic facets necessary to my invention have been used in the prior art, it is only when these are used in their proper combinations and improvements added thereto that there emerges an invention which is useful because the manufacture is economical, the storing, handling, and shipping is easily accomplished, the installation is effected with ease, and costs are commensurate with its durability and life.

A primary object of my invention is to furnish an irrigator comprising an impermeable pipe having tiny, round holes drilled radially through its walls of such diameter that their area corresponds to a calculated percentage of the area of the opening in the pipe, thereby accurately controlling the flow of fluid from the irrigator.

A further primary object of my invention is to furnish an irrigator permitting of optimum control of fluid egress from the initial filling, having tiny, flexible tubes protruding radially inward from the openings at the inlet end of pipe and becoming less frequent toward the closed, remote end, acting as individual valves by bending and closing while the fluid is moving rapidly, but straightening out as the initial filling is acomplished, permitting the fluid to then flow at the supply end of the pipe, thus causing a more even flow the entire length of the pipe from the initial filling.

Another primary object of my invention is to furnish an irrigator of pre-calculated manufacturing cost, composed of articles presently produced in the United States in great volume for other purposes by modifying and combining said articles to my desired end.

A further primary object of my invention is to furnish an irrigator which when buried in any type of soil will be permanent, will withstand freezing when full of water or empty, composed of a plastic pipe containing tiny, round holes covered with loose, plastic patches, circumferential covering of fine glass fibers, a wrapping of plastic or fibrous glass window screen, and a spiral winding of plastic covered wire.

The foregoing objects explicating the advantages of my invention together with various other advantages which will become obvious, may be attained with the embodiments of my invention illustrated in the accompanying drawing.

Referring to the drawing:

FIG. 1 is a plan view of a section of an irrigator constructed in accordance with the invention.

FIG. 2 is a vertical cross-sectional view taken along line 2—2 of FIG. 1.

FIG. 3 is a side elevation, in section, of the embodiment of the invention.

FIG. 4 is a cross-section of another embodiment of the invention.

FIG. 5 is a diagrammatic plan view showing how irrigator may be placed in soil with supply header.

Referring to FIG. 1 of the drawing, the window screen 3 forming the outer covering of the irrigator is strengthened and bound in place by a wire covered with plastic 4.

Referring now to FIG. 2 showing in detail the embodiment of this invention, the pipe 1, preferably extruded from flexible, medium density polyethylene has tiny holes 6 drilled radially along its length, the area of the holes being a known percentage of the area of opening in pipe 1 have the advantage of extremely accurate predetermined flow of water therefrom. Tightly compressed around the pipe 1 by plastic or fiber glass window screen 3 preferably of 14 x 18 mesh is a layer of very fine glass fibers 2 which may be varied in density and may be used from ⅛-inch to ⅜-inch thick, all of which is further strengthened and held in place by a spiral winding of galvanized wire 8 covered with plastic 4 which also is sealed on the ends and has the advantage of the strength of steel with the underground durability of plastic of which polyvinyl chloride composition is desired for this purpose, the entire assembly permitting coiling for ease of handling, shipping, and storing. The accurately drilled holes 6 are covered with thin, loose plastic patches or spreaders 7 which perform the desirable feature of protecting the glass fiber matting 2 from the jet-like streams of water under high pressure, breaking up the spewing and slowing the water to a seeping action, and spreading the water of each hole over a larger area around the irrigator.

Referring now to FIG. 4, the holes 6 of FIG. 2 may be enlarged as 9 and tiny, flexible tubes 10 inserted in them flush with the exterior surface of pipe 1, extending inwardly to act as their own individual valves, bending from the force of moving water and closing their passageway 11, but straightening and opening when the water velocity decreases, thus when inserted in the holes at the supply end of the irrigator, with less frequency toward the closed remote end, they have the advantage of preventing flow through the irrigator walls at the supply end until the irrigator is filled with water to the remote end, resulting in uniform distribution of water from the initial flow.

Referring to FIG. 5, irrigators 12, 13, 14, 15, 16, and 17 are shown attached to manifold 18 merely to indicate a typical placing of irrigators which are preferably 400 feet long attached to a header of larger diameter at one end and closed at the other, located in the soil by the simplest possible layout which covers the desired area evenly and completely with the depth of placement and the spacing between governed by a prior percolation test of the soil, the type of crop to be grown, the depth of the top soil, as well as the soil structure directly below the top soil.

From the foregoing description it will be seen that the present invention provides an irrigator for sub-surface installation which is permanent, operates efficiently on high pressure water supply, produces extremely accurate water distribution at varying pressures, and provides for uniform distribution of initial water flow.

Although only two embodiments of my invention have been described herein it is not my intent to limit the protection sought to the disclosure when it is understood that modification and substitutions may be incorporated in said embodiments without departing from the spirit of the invention.

I therefore desiring to protect by Letters Patent do claim:

1. A sub-surface soil irrigator comprising a plastic pipe having tiny holes drilled radially through its walls for its entire length, said holes covered with loose, plastic patches, the entire pipe being covered with a blanket of fine glass fibers firmly held by fiber glass window screen bound with spirally wound plastic coated galvanized steel wire.

2. A sub-surface soil irrigator comprising a plastic pipe having tiny holes drilled radially through its walls for its entire length with those near the inlet larger and containing small, flexible tubes flush with the outer surface of the pipe, protruding into the pipe, all drilled holes being covered with small, loose, plastic patches, the entire pipe covered with a blanket of fine glass fibers firmly held by fiber glass window screen bound with spirally wound plastic covered, galvanized, steel wire.

References Cited by the Examiner

UNITED STATES PATENTS

| | | | |
|---|---|---|---|
| 299,347 | 5/1884 | Chisholm | 61—13 |
| 2,052,020 | 8/1936 | Black | 61—13 |
| 2,798,768 | 7/1957 | Babin | 61—13 X |
| 3,080,124 | 3/1963 | Rathmann. | |
| 3,103,789 | 9/1963 | McDuff et al. | 61—11 |

EARL J. WITMER, *Primary Examiner.*